US011037223B1

(12) United States Patent
Davey et al.

(10) Patent No.: US 11,037,223 B1
(45) Date of Patent: *Jun. 15, 2021

(54) SYSTEM AND METHOD FOR PRINTING POSTAGE

(71) Applicant: PSI SYSTEMS, INC., El Segundo, CA (US)

(72) Inventors: Jason Davey, San Anselmo, CA (US); Patrick Sean Farry, Santa Clara, CA (US)

(73) Assignee: PSI Systems, Inc., El Segundo, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 16/264,249

(22) Filed: Jan. 31, 2019

Related U.S. Application Data

(63) Continuation of application No. 14/503,816, filed on Oct. 1, 2014, now Pat. No. 10,223,736.

(60) Provisional application No. 61/885,212, filed on Oct. 1, 2013.

(51) Int. Cl.
*G06Q 30/00* (2012.01)
*G06Q 30/06* (2012.01)

(52) U.S. Cl.
CPC ..... *G06Q 30/0637* (2013.01); *G06Q 2250/00* (2013.01)

(58) Field of Classification Search
None
See application file for complete search history.

(56) References Cited

U.S. PATENT DOCUMENTS

| 4,831,555 | A | | 5/1989 | Sansone |
| 5,337,246 | A | | 8/1994 | Carroll |
| 6,005,945 | A | * | 12/1999 | Whitehouse ....... G07B 17/0008 380/51 |
| 7,085,725 | B1 | * | 8/2006 | Leon .................. G06Q 30/0609 705/26.35 |
| 7,194,957 | B1 | * | 3/2007 | Leon ....................... B41J 11/42 101/483 |
| 7,233,929 | B1 | | 6/2007 | Lingle |
| 7,778,924 | B1 | | 8/2010 | Ananda |

(Continued)

OTHER PUBLICATIONS

Peyman Oreizy et al. "The Web as Enabling Technology for Software Development and Distribution" IEEE Internet Computing November • Dec. 1997 pp. 84-87 (Year: 1997).*

(Continued)

*Primary Examiner* — Naeem U Haq
(74) *Attorney, Agent, or Firm* — Pillsbury Winthrop Shaw Pittman LLP

(57) ABSTRACT

In some embodiments, a web-based postage transaction may be facilitated. In some embodiments, an applet embedded on a web page may be provided to a client computer in response to the client computer accessing the web page. A request related to a postage transaction may be received from the client computer. In response to the request, a validation check may be performed by providing a validation token to the embedded applet at the client computer to be validated by the embedded applet. Based on a determination by the embedded applet at the client computer that the validation token is valid, the embedded applet at the client computer is configured to execute at least a part of the request.

20 Claims, 8 Drawing Sheets

(56) References Cited

U.S. PATENT DOCUMENTS

| | | | |
|---|---|---|---|
| 8,521,653 B2 | 8/2013 | Novack | |
| 8,607,306 B1 | 12/2013 | Bridge | |
| 9,081,948 B2* | 7/2015 | Magne | H04L 63/0853 |
| 10,089,797 B1* | 10/2018 | Begen | G07B 17/0008 |
| 2002/0023057 A1* | 2/2002 | Goodwin | G06Q 30/02 |
| | | | 705/50 |
| 2002/0040353 A1* | 4/2002 | Brown, Jr. | G07B 17/0008 |
| | | | 705/401 |
| 2002/0046195 A1* | 4/2002 | Martin | G07B 17/0008 |
| | | | 705/401 |
| 2003/0037072 A1* | 2/2003 | Bowman | G06Q 30/02 |
| 2003/0084008 A1* | 5/2003 | Simpson | G07B 17/00024 |
| | | | 705/408 |
| 2003/0093498 A1* | 5/2003 | Simpson | H04L 29/06 |
| | | | 709/218 |
| 2003/0101143 A1 | 5/2003 | Montgomery | |
| 2003/0187666 A1* | 10/2003 | Leon | G07F 17/26 |
| | | | 705/404 |
| 2009/0164392 A1 | 6/2009 | Raju | |
| 2010/0042545 A1 | 2/2010 | Ogg | |
| 2010/0312627 A1 | 12/2010 | Khechef | |
| 2011/0078091 A1 | 3/2011 | Kara | |
| 2011/0242554 A1 | 10/2011 | Farry | |
| 2014/0325627 A1* | 10/2014 | Fee | H04L 63/0807 |
| | | | 726/7 |

OTHER PUBLICATIONS

Dennis Wurster "Printing Shipping Labels from PayPal's Shopping Cart" TidBITS Dec. 4, 2008. Retrieved from https://tidbits.com/2008/12/04/printing-shipping-labels-from-paypals-shopping-cart/ (Year: 2008).*

Paul Deitel et al. "Java How to Program", Ninth Edition © 2012 Pearson Education, Inc. pp. 941-999. ISBN-13: 978-0-13-257566-9 (Year: 2012).

* cited by examiner

SYSTEM AND METHOD FOR PRINTING POSTAGE

CROSS-REFERENCE TO RELATED APPLICATIONS

This application is a continuation of U.S. patent application Ser. No. 14/503,816, filed Oct. 1, 2014, which claims the benefit of U.S. Provisional Application No. 61/885,212, filed on Oct. 1, 2013, each of which is incorporated herein by reference in its entirety.

BACKGROUND OF THE INVENTION

Field of the Invention

The present invention pertains to systems and methods for providing printable postage and more particularly to such systems and methods incorporating validation and device management features.

Discussion of Related Art

Online postage systems, including, for example, Endicia™ Internet Postage (www.endicia.com), enable Internet users to purchase United States postage and apply individual postage indicia to a wide spectrum of envelopes and labels using standard computer printers. These systems tend to be based on the concept of Information Based Indicia ("IBP"), wherein information uniquely identifying a particular postage indicium (e.g., postage meter account number and meter piece count) is presented in a barcode and/or human readable form on each mailpiece.

The industry of electronic commerce (or "e-commerce") has greatly contributed to growth in the popularity of online postage services, which provide an efficient and cost-effective way to support a high volume of transactions that e-commerce companies typically deal with. For example, Endicia™ Internet Postage enables e-commerce sellers to purchase and print a virtually unlimited number of postage and shipping labels upon immediate request, which allows sellers to rapidly fulfill product orders, even at high volume, without expensive postage metering hardware.

As a result, purchasing postage over the Internet has been increasingly popular among volume sellers and ordinary citizens alike as a way of obtaining postage without having to make a trip to the local post office or postage retailer. Using these systems, any customer can use an online postage system to print postage from the comfort of their home or office. For example, any user with a computer and a network connection can simply access the online postage system to purchase postage. Upon receiving payment from the user, the online postage service provider may then send postage data back to the user to allow the postage to be printed using any suitable printer that may be connected to the computer (e.g., an inkjet or laser printer).

However, postage affixed to a mail piece must typically conform to a variety of security and authenticity specifications of the relevant national post office before being deliverable via that office. For instance, the United States Postal Service requires that certain codes, marks, or other indicia be printed on a postage label in a predetermined configuration. Therefore, the manner in which online postage is provided to a printer can be critical, as misprinted postage indicia may cost users time, money, or other hassles associated with requesting reimbursement and submitting proof of the misprint. Furthermore, as discussed above, different national post offices typically have different security and authenticity requirements.

Typically, the printing of postage via a web service relies on delivery of applets that are executable to print in conformity with the regulations and specifications described above. However, this approach leads to the possibility that the client side system may download the code for the applet and execute it offline, thereby avoiding incurring a charge to the user's account.

Another issue is that end users of such Internet-based systems may have widely varying hardware configurations. For example, each user may have a different printer, different printer configurations including drivers, different metering scales, and the like. Each of these pieces of hardware may affect revenue-related print operations. For example, printing postage may incur a user charge. Likewise, the metered weight of a package may affect the postage selected for printing. A web-served application may have difficulty interfacing with the potential variety of hardware on the client side, resulting in poor user experience and or over or under charges due to problems with printing or weighing items to be shipped.

Embodiments address various issues relating to the above and other issues with conventional approaches.

BRIEF SUMMARY OF THE INVENTION

An aspect of an embodiment of the present invention is to provide a method for conducting a web-based postage transaction includes receiving user credentials at a web server, validating the received user credentials, and in response to valid user credentials, providing access to a remote client to at least one module of a postage software application, the module being configured to execute requests to perform the web-based postage transaction and to, for each revenue generating request, perform a validation check, wherein the validation check includes a requirement that the module have access to the web server for the request to be fulfilled.

Another aspect of an embodiment provides a system for conducting a web-based postage transaction, includes a web server, configured and arranged to receive user credentials, the web server further being configured and arranged to validate the received user credentials and to, in response to valid user credentials, provide access to a remote client to at least one module of a postage software application, the module being configured to execute requests to perform the web-based postage transaction and to, for each revenue generating request, perform a validation check, wherein the validation check includes a requirement that the module have access to the web server for the request to be fulfilled.

Another aspect of an embodiment provides a non-transitory machine readable medium encoded with machine executable instructions for performing a method for conducting a web-based postage transaction, the method including receiving user credentials at a web server, validating the received user credentials, in response to valid user credentials, providing access to a remote client to at least one module of a postage software application, the module being configured to execute requests to perform the web-based postage transaction and to, for each revenue generating request, perform a validation check, wherein the validation check includes a requirement that the module have access to the web server for the request to be fulfilled.

Another aspect of an embodiment provides a method for conducting a web-based postage transaction, including providing user credentials to a web server, in response to the provided user credentials, receiving access to at least one module of a postage software application, the module being configured to execute requests to perform the web-based postage transaction and to, for each revenue generating request, perform a validation check, wherein the validation check includes a requirement that the module have access to the web server for the request to be fulfilled.

Another aspect of an embodiment provides a method of interfacing with a client-side device in a web-based postage printing system, includes receiving a request from a user to perform an operation associated with postage printing, the request requiring operation of the client-side device, generating, based on the request, a query to an operating system of a computing device in communication with the client-side device regarding an availability of the client-side device, and when the client-side device is unavailable, preventing execution of the request, and when the client-side device is available, allowing execution of the request.

Another aspect of an embodiment provides a non-transitory machine readable medium encoded with machine executable instructions for performing a method of interfacing with a client-side device in a web-based postage printing system, the method including receiving a request from a user to perform an operation associated with postage printing, the request requiring operation of the client-side device, generating, based on the request, a query to an operating system of a computing device in communication with the client-side device regarding an availability of the client-side device, and when the client-side device is unavailable, preventing execution of the request, and when the client-side device is available, allowing execution of the request.

Although the various steps of the method are described in the above paragraphs as occurring in a certain order, the present application is not bound by the order in which the various steps occur. In fact, in alternative embodiments, the various steps can be executed in an order different from the order described above or otherwise herein.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF EMBODIMENTS OF THE INVENTION

Figure 1:
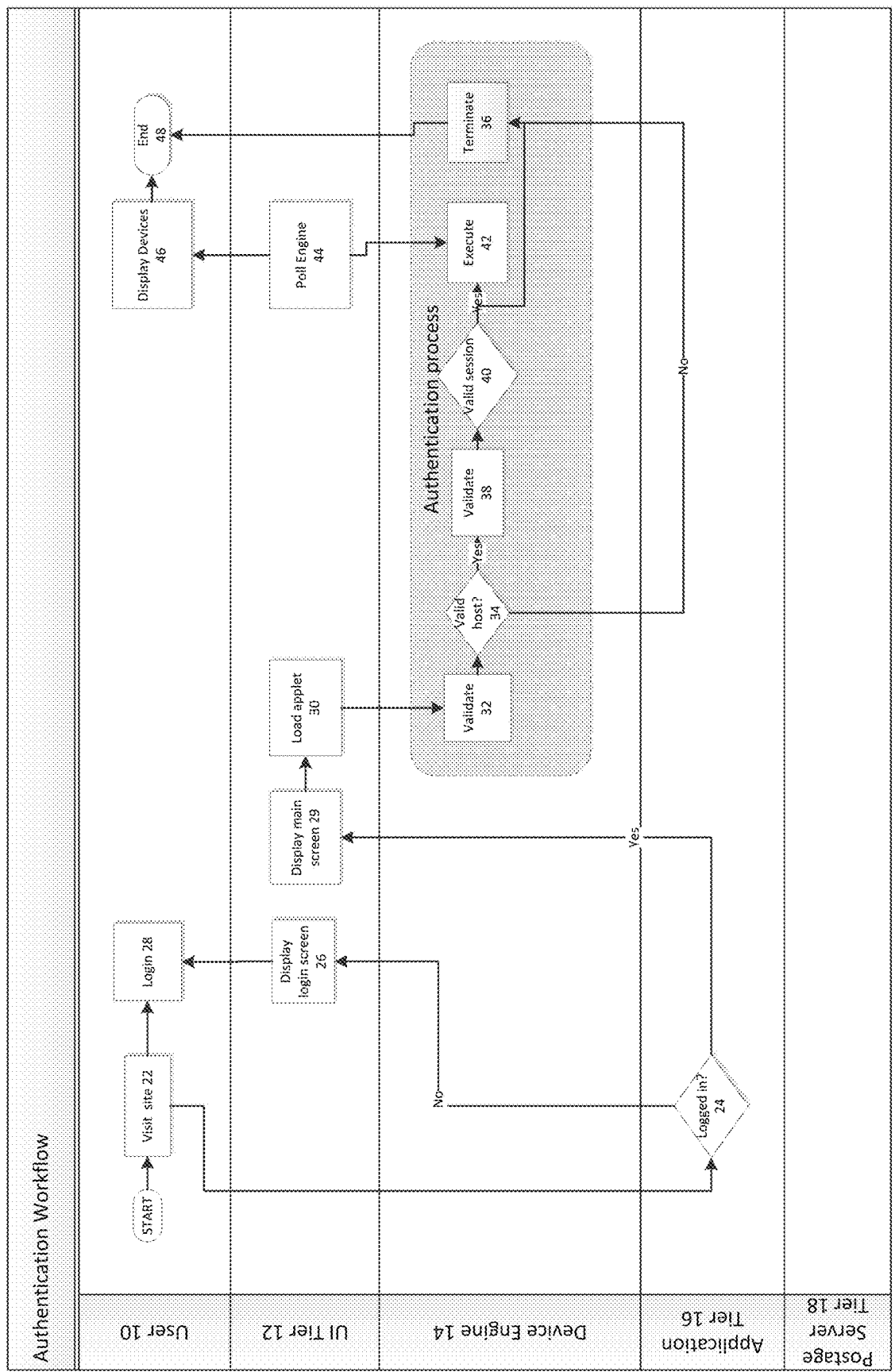
FIG. 1 is an illustration of a secure workflow for providing postage printing functionality, according to an embodiment of the present invention.

FIG. 1 schematically illustrates layers of a system for providing an online stamp printing service, according to an embodiment of the present invention. In particular, FIG. 1 illustrates a system security aspect of the online stamp printing service.

As will be appreciated from FIG. 1, this embodiment is focused primarily on aspects that are executed at the client side of the service. As noted above, web services raise the issue that a user may access an applet, then execute print operations using that applet while offline. This may in turn allow that user to print postage without being properly charged. In order to mitigate that risk, the illustrated embodiment provides security at the client side, so that the potential for uncharged printing of postage is reduced or eliminated, even where a connection to the server side is not maintained.

As shown in FIG. 1, a user tier 10 represents actions to be taken by a user of the system at a client side. Also on the client side is provided a user interface (UI) tier 12, the use of which allows the user actions to be taken. UI tier 12 that provides a user-side interface, includes typically, a web browser such as a browser on a mobile device, smartphone, tablet, personal computer or the like.

A device engine 14 is the applet that allows the postage printing functionality that is provided on the client side while application tier 16 is implemented on the server side and interfaces with the client side functions, and can provide communications to the postage server tier 18. For example, the device engine 14 can be embedded in the web page (HTML) as a resource.

In one implementation, the server side may be embodied in a cluster of physical servers, each being configured for secure communications with the client side and each having a payment mechanism for handling secure financial transactions. Furthermore, the server array may be arranged in a redundant, load balanced server array, including any number of computer servers that share incoming transactional traffic. As a result, if any of the servers fail or otherwise require removal from service (e.g., if a pending failure has been detected or a software upgrade is required), the remaining servers may automatically pick up any transactional load.

In the illustrated embodiment, the process generally begins, at 22, with a user 10 using a web browser to visit the host website (for example, DYMOStamps.com or a third-party website integrating therewith or otherwise offering postage services). Any web browser can be used including, but not limited to, INTERNET EXPLORER from MICROSOFT corp., MOZILLA FIREFOX from MOZILLA Corp., CHROME from GOOGLE, SAFARI from APPLE, Inc., OPERA from OPERA SOFTWARE, etc. On serving the home page, the application tier 16 on the server side may check at 24 to see if the user 10 is currently logged in. If the user 10 is not logged in, a login page is served and the UI tier 12 displays the login page, at 26. The user may then login using a username and password, or other authentication scheme, at 28.

Once the application tier 16 determines that the user 10 is properly logged in, it serves a main screen, at 29, via the UI tier 12. The UI tier 12 then may load an applet at 30 and call the device engine applet 14.

In an embodiment, the device engine applet 14 includes security features to ensure that the user is properly validated and logged in to the server side layers during operation of the system. In the illustrated embodiment, there are at least two aspects of the security features that can work together to reduce system vulnerability.

A first aspect of the security features in this embodiment is a host validation process, at 32. In this aspect, the applet code may include embedded host addresses. By host it is meant a uniform resource locator (URL) used by the device engine 14 to fulfill the requests of the device engine 14. The host addresses may be encrypted and/or otherwise obscured, and hidden within the applet code. In an embodiment, the host addresses are included in the source code for the applet (device engine 14), and thus are not easily recoverable once that source code has been compiled prior to transmission to the end user.

By way of example, the host addresses may include an address for the postage server, which, in one embodiment, are not publicized or transmitted in the clear during printing operations. Alternately, the host address may simply be an address for a validation server that plays no role in the process other than security. Next, the device engine 14 compares, at 34, the stored host address against a host to which the device engine 14 is connected. In the case that the host is not able to be validated, the process is terminated, at 36. If the host is valid, then the process may continue.

A second security aspect is a session validation, at 38. The session validation process, at 38, may make use of session tokens, which may be provided by the application tier 16 upon login. After the user logs in, at 26, and the device engine applet is loaded, at 30, the application server 16 provides the validation token to the applet. The applet may be configured to check the session token, at 40. If the session token is not valid, the applet terminates the session, at 36. If, on the other hand, the session is valid, the user is allowed to continue with the session and execute the session, at 42. In the illustrated example, the device engine 14 then provides available device information "Poll Engine" to the UI tier 12, at 44. The user 10 is shown a list of the available devices from which the user may select to fulfill a given request, such as printing, at 46, and the workflow ends 48. Devices include Roll Printers, Shipping Label Printers, other printers and Electronic Scales. Shipping Label Printers may include, for example, DYMO LabelWriter 4XL, ZDesigner GX420d, etc. Roll Printers may include, for example, DYMO LabelWriter 400, DYMO LabelWriter 400 Turbo, etc. Other "printers" include for example SnagIt, BullZip, Fax, Microsoft XPS, OneNote, PDF, Microsoft Office Live Meeting, WebEx, etc. Electronic scales may include any scales from ENDICIA, DYMO, SANFORD, ELANE, PITNEY BOWES, etc.

In an embodiment, the session token may become invalid in response to a specified condition. For example, the condition may be a logout by the user from the postage server, the expiration of a specified amount of time, a specified amount of time between user actions, logout or sleep condition at the user's device, or another trigger.

In an embodiment, the token that is provided by the application server 16 may be associated with a particular account number (or username), passphrase, session identification code (ID) and/or Internet Protocol (IP) address (for example, the user's IP address). When a validity of the token is checked, other identifying information can also be checked before a request is executed. The token may, in this regard, include and/or primarily consist of the identifying information (e.g., account number, passphrase, and/or session ID, etc.) in an encrypted form. In this approach, the token includes the identifying information in the encrypted form and the validation process may include decryption of the identifying information and comparison against session information.

In an embodiment, the token validation may be performed according to a schedule (i.e., at specified time intervals). Alternately, token validation may be performed for every request. As will be appreciated, even where all appropriate user actions have been taken (i.e., there is no intentional fraudulent behavior by the user) there is the possibility of identifying an insecure condition and termination of the session. This could lead to unpleasant user experiences, which is not a desirable outcome. In view of this, the validation check may be performed only in response to a revenue-generating request.

By way of example, a revenue-generating request may be a request for printing of a shipping label, stamps, or certified mail envelopes or stationery, or generating or printing a customs form or other forms for which the provider would like to charge customers. Likewise, a purchase of customer credit for future application to services or products may constitute a revenue-generating request.

Figure 2:
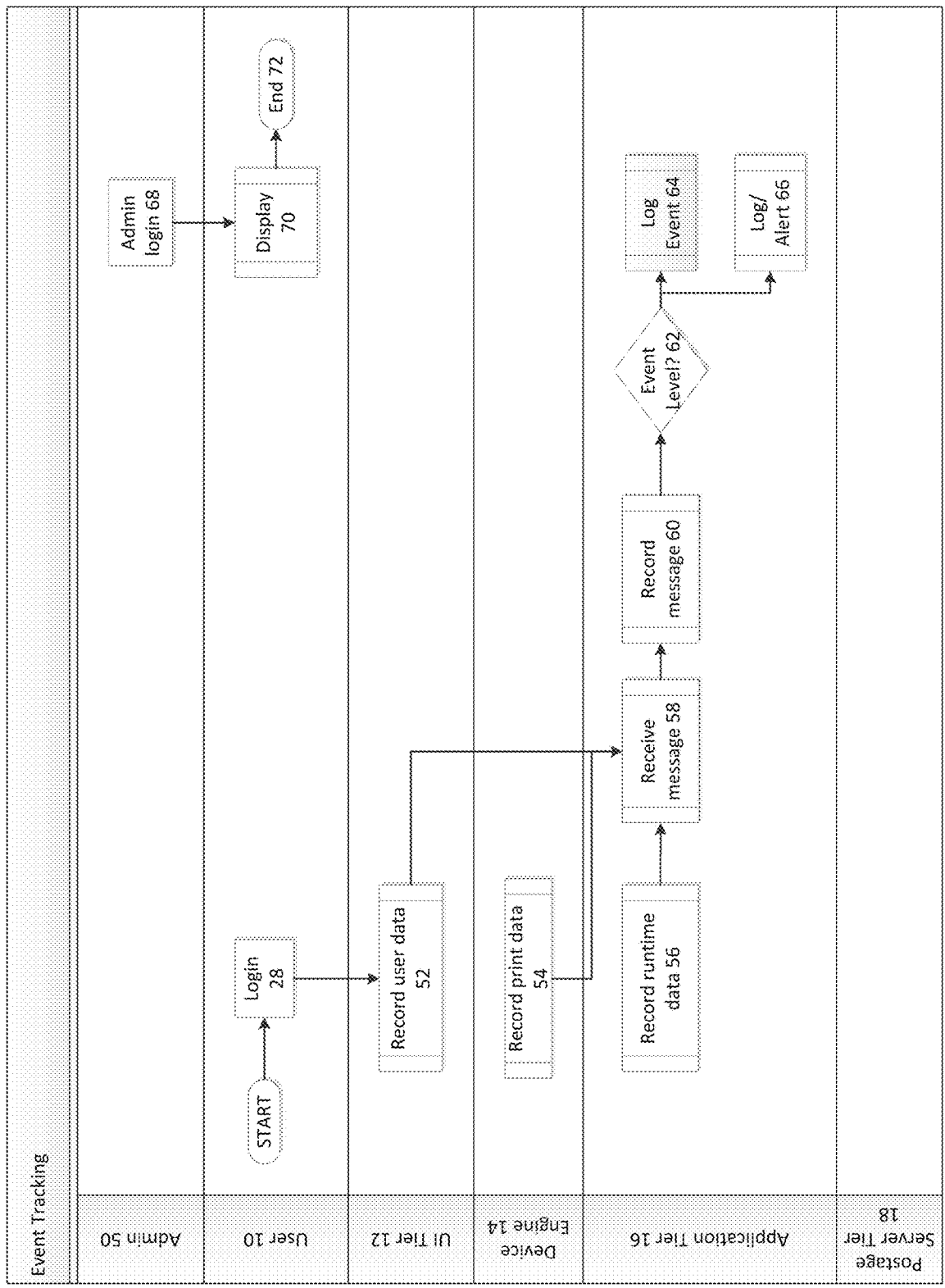
FIG. 2 is an illustration of an event tracking workflow for use in a postage printing system, according to an embodiment of the present invention.

In an embodiment, event tracking functionality may also be included as illustrated schematically in FIG. 2. Event tracking may be used both as an adjunct to security functionality and as a tool for providing technical support to users. In the illustrated embodiment, a user 10 logs in, at 28, to make use of the system (including but not limited to the user interface Tier 12, client side and server side). The user 10 does not have access to the administration tier 50, which is available only to the administrator of the system. The administration tier 50 can be an internal system which has a user interface UI that interfaces with data accessible to an administrator of the system (e.g., a postage provider).

The UI tier 12 records user and platform data relating to the session, at 52. In this regard, it may be useful to associate a user name with the session, along with information identifying the device on which the user is accessing the system and/or the software that is running on that device. As an example, the information may include a browser name and version as well as information describing the hardware configuration (e.g., processor, display, and/or memory, etc.).

At the same time, the device engine 14 records permissions and printing activity data (e.g., login and/or validation related information), at 54, and the application tier 16 that resides on the server records user requests and application runtime data, at 56. When an event to be logged occurs, the data recorded at 52, 54 and 56 are received by the application tier 16, at 58. The event messages (user data, print data, runtime data, etc.) are stored in a database, at 60, or alternately, stored in a text file that, where necessary or desirable, may periodically be transferred to a database.

Once events are stored, at 60, the events may be analyzed to discriminate an event level, at 62. Events that are minor, such as, information, warning, or events that have some business value, may simply be logged, at 64. Higher priority events, such as fatal events or events relating to failed revenue generating requests may be logged and an alert may be generated, at 66. As an example, generating an alert may involve generating an e-mail to a responsible system administrator.

When necessary, a system administrator or administrators log in to the administrative tier 50, and may perform supervisory functions. When supporting the user 10, the administrator may allow event activity to be displayed, at 70, at the UI tier 12, at which point the illustrated workflow ends.

Because logged data is received by and stored at the server side, it may have a higher degree of trustworthiness as compared to client side logged data. This approach to controlling event log data may as a result form another aspect of the overall security approach to the system. By way of example, such server side control tends to prevent users from modifying the log to include failed revenue generating requests, or other events that could result in a loss to the service provider.

Figure 3:
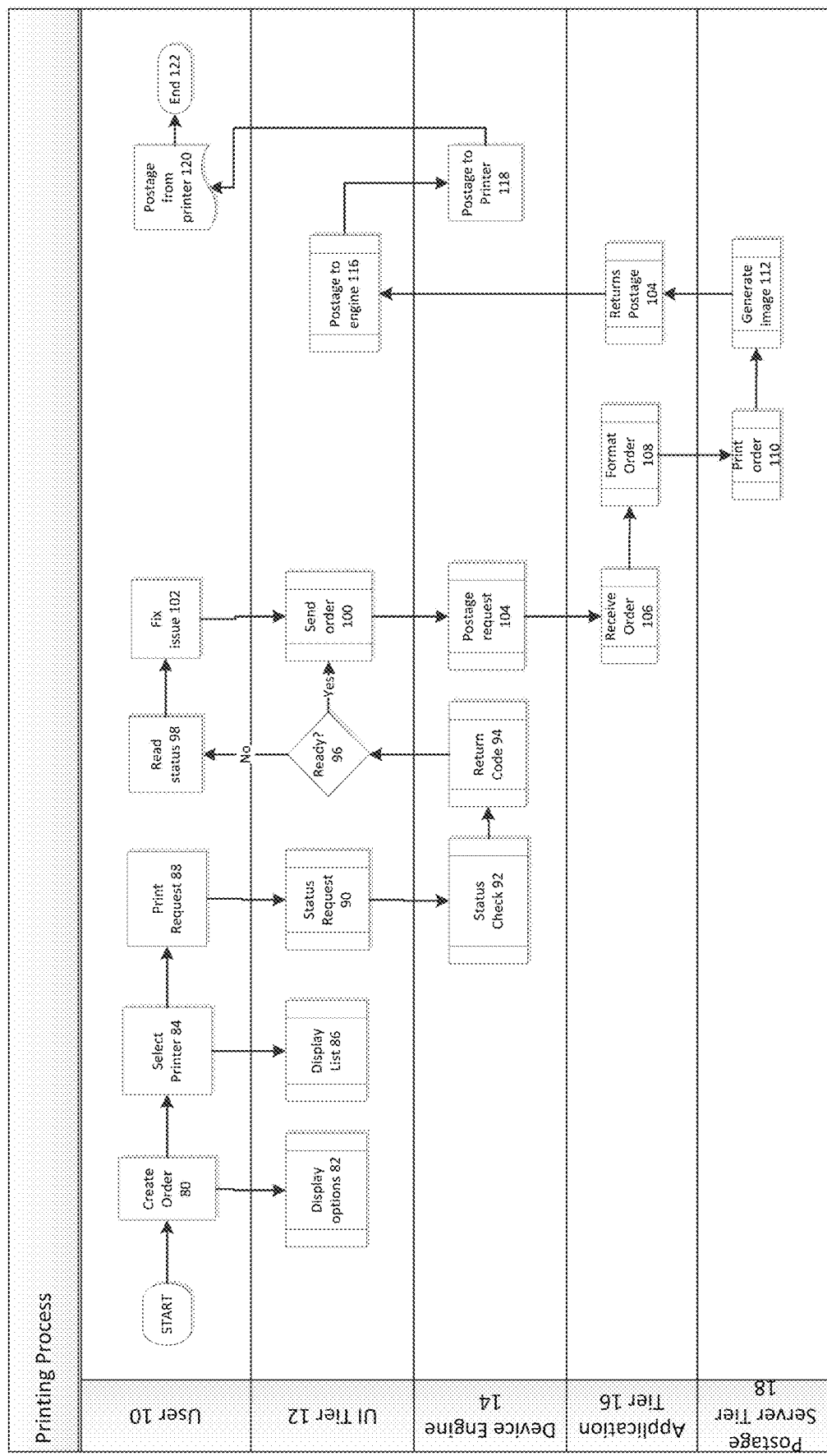
FIG. 3 is an illustration of a printing workflow incorporating device management functionality in a postage printing system, according to an embodiment of the present invention.

In an embodiment, the device engine includes functionality for allowing the application tier 16 to interact with a variety of client side devices that are used in the workflow. For example, as illustrated in FIG. 3, it may be useful to integrate information regarding a user's printer status. In particular, because the print operations are typically revenue generating, a failure at the user's device may lead to a charge to the user without receipt of the requested printed postage. As will be appreciated, this outcome results in a dissatisfied user. In response, the service provider will at a minimum need to address the problem by way of customer support to resolve any issues. At worst, the result is a lost customer and poor word of mouth regarding the service.

In view of this, a workflow may include creation 80 of a postage order by a user. In response, the UI tier 12 displays 82 the order choices to the user. The user selects 84 a printer from a printer list displayed 86 by the UI tier. After making the order choices and selecting the printer, the user submits 88 a print request, which may be considered to be a revenue generating request for the purposes of the security functionality described above.

The UI tier 12 requests printer status, at 90, before the print job is executed and before a charge is initiated to an account of the user 10. This request is handled by the device engine 14 which checks the printer status, at 92, and returns a status code to the UI tier 12, at 94. The UI tier 12 checks the status code, at 96, and either provides an error status message to the user for reading, at 98, or sends the print order for printing, at 100.

If the user 10 receives an error status message, at 98, the printer issue may be addressed by the user 10 to correct the error, at 102. Once the error is corrected, at 102, control proceeds to send the order to print, at 100, and the device engine 14 allows the request for printable postage to be generated, at 104.

The request to generate postage is received by the application tier 16, at 106. The application tier 16 formats the order into a structure that can be interpreted at the postage server tier 18, at 108. The postage server tier 18 receives the formatted print order, at 110, and generates a postage image for printing, at 112. The postage image complies with the security and authenticity specifications for the relevant postage service. The generated postage image is returned by the application tier 16 to the UI tier 12, at 104. The UI tier 12 in turn sends the printable postage to the device engine 14, at 116, from whence it is sent to the printer queue for printing, at 118. Once printed, the user 10 may collect the postage from the printer, at 120, ending the workflow, at 122.

Generally, the printing process will involve some degree of control at the client side in order to control the output format of postage being printed. Historically, printing on envelopes has been difficult because different printer models have different configurations with respect to envelope orientation, margins, no-print zones, feed mechanisms, and other configurations. Furthermore, when using a web browser interface, there tends to be considerable variation in the manner in which various different browser versions handle printing. For instances, different browsers may have different levels of support for print layouts, margin sizes, or other printer configurations. Thus, in the context of a web-based postage system, image-based formats such as, for example, Portable Document Format (PDF) provide an effective mechanism for controlling print output. Thus, the printing process may create printable documents containing fully configured postage images formatted as PDFs. Although, a PDF format is used, other types of format can also be used depending, for example, on the type of printer used and web-browser compatibility. For example, Eltron Programming Language (EPL) format or Zebra Programming Language (ZPL) format can be used for printing postage stamp labels on Zebra model printers.

In a particular implementation of the process described above, the printing process allows the system to send printable postage images directly to the user's printer, bypassing any other applications. However, many commonly used operating systems do not provide native support for PDF documents, meaning that some software must be present on the user's system to translate from the PDF file format to a format that can be provided to a printer. Providing a reader application (e.g., Adobe Acrobat Reader) may not provide an adequate solution because users would be able to save and reprint the postage image. Additionally, custom browser plug-ins generally suffer from drawbacks in that the user must download a client application and the plug-in must be reconfigured for different browser versions.

Thus, in one embodiment, the device engine functionality within device engine 14 may be provided in a Java applet configured to run securely and transparently within a web-browser window. In particular, the Java applet, which acts as the device engine 14 that resides at the client side, may cause the user's system to render the electronic form of the postage image on a printer (i.e., the Java applet renders the printable postage image to a printer device rather than a display or screen coupled to the user system). In one implementation, the script may be based on jPDFPrint, which provides a Java applet that allows for silent printing of PDF documents. When the postage request has been processed, the system may encapsulate a PDF postage image with the jPDFPrint applet to create a seamless silent print experience for the user. Many web-browsers may require appropriate configurations to execute Java applets. For instance, the first time that a user (e.g., user 10) engages in the printing process, the user 10 may be presented with a window or dialogue box that appears when a download is requested from a site. If the user 10 approves the download or the user's web-browser (UI tier 12) is configured to automatically allow execution of scripts, the applet may be delivered to the user 10. In one implementation, the applet may be delivered to the user's system with the postage image, and the applet may thereafter reside in the user's web-browser cache until the cache is cleared or the web-browser otherwise removes the applet. If the user 10 subsequently requests another postage image, the applet may be downloaded to the user's browser.

Further information describing techniques that may be used to generate the postage indicia are described in U.S.

Pat. No. 6,005,945, entitled "System and Method for Dispensing Postage based on Telephonic or Web Milli-Transactions," issued Dec. 21, 1999, co-pending U.S. patent application Ser. No. 09/990,605, entitled "Systems and Methods for Detecting Postage Fraud Using a Unique Mail Piece Indicium," filed Nov. 20, 2001, and U.S. patent application Ser. No. 13/139,474, entitled "System and Method for Providing an Extensible Multinational Postage Service and System and Method that Delivers Printable Postage to a Client Device," filed as a PCT application Dec. 8, 2009, the disclosures of which are hereby incorporated by reference in their entirety.

Figure 4:
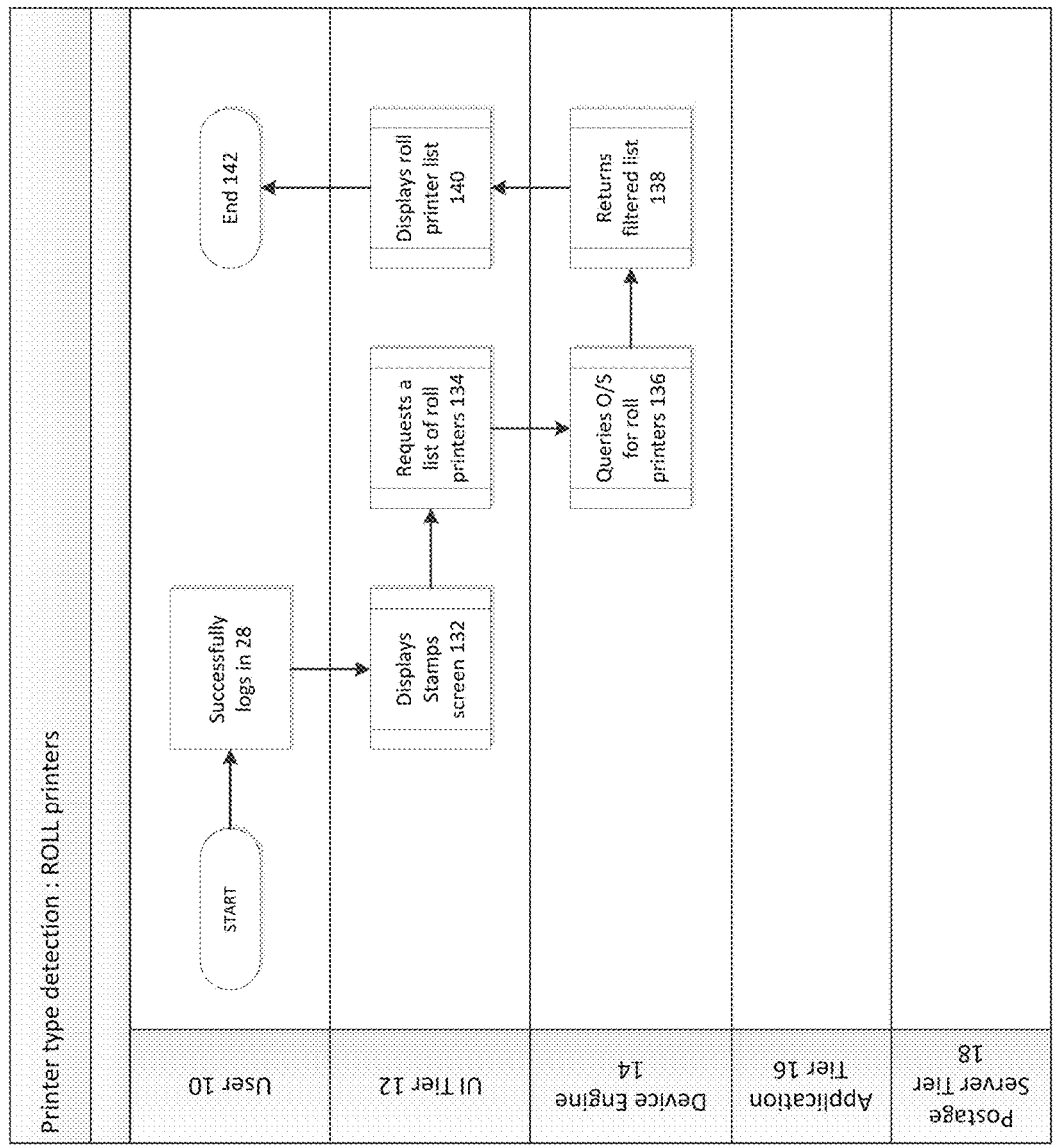
FIG. 4 is an illustration of a printer identification workflow, according to an embodiment of the present invention.

FIG. 4 illustrates a particular workflow for detection of a particular printer type, specifically a printer adapted to printing on stamp label rolls, such as a DYMO Label Writer® printer. The user logs in, at 28, and the UI tier 12 displays a stamp screen, at 132. The UI tier 12 requests a list of available roll printers, at 134, from the device engine 14. The device engine 14 in turn queries the operating system (OS) on the computer of the user 10 (client) for supported roll printers, at 136. The response from the operating system (OS) is filtered by driver name and a whitelist, which may be hard-coded, of approved printers, then returned to the UI tier 12, at 138. The UI tier 12 then displays the printer list, at 140, and the workflow ends, at 142.

Figure 5:
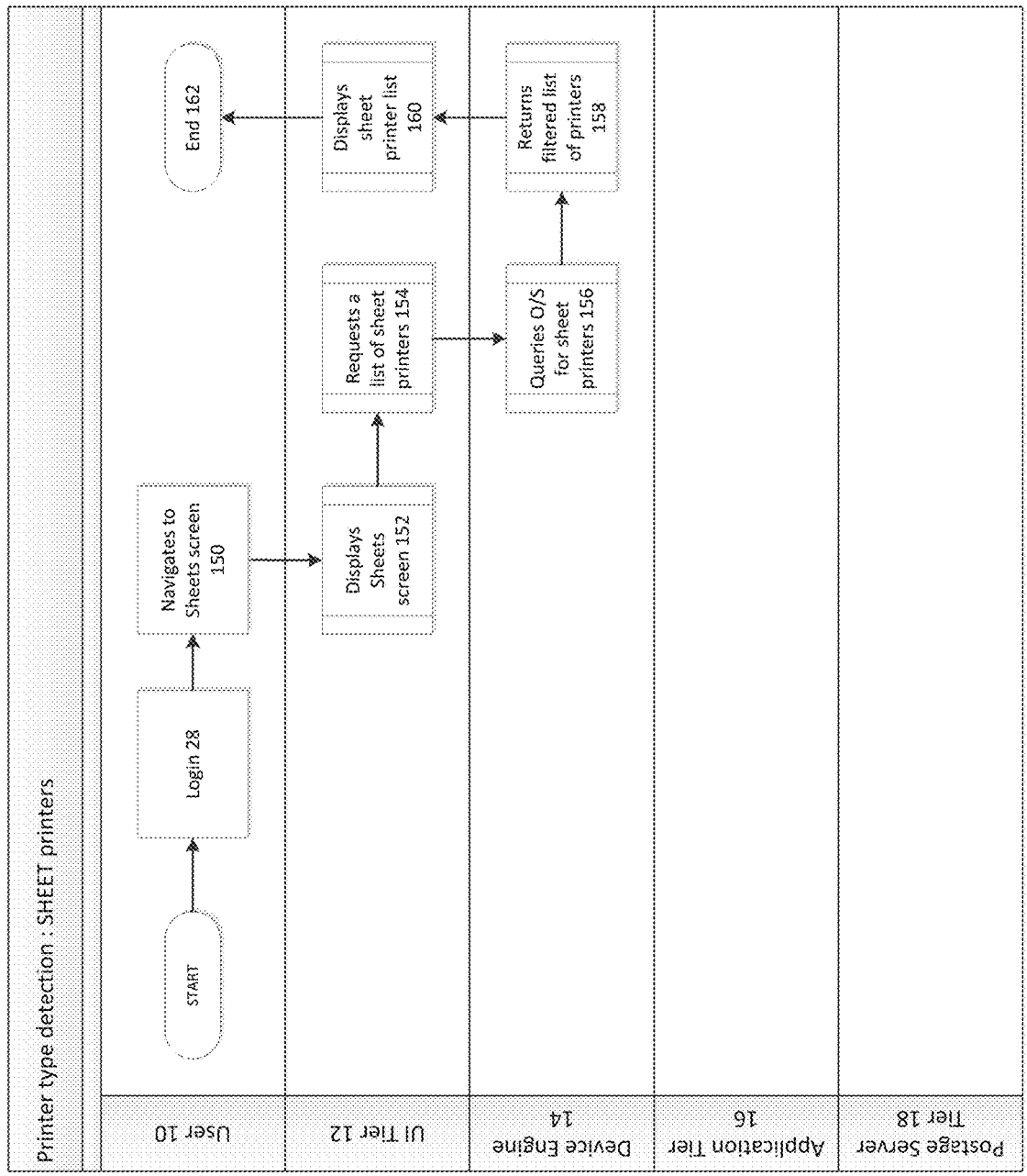
FIG. 5 is an illustration of an alternate printer identification workflow, according to another embodiment of the present invention.

FIG. 5 is similar to FIG. 4, but relates to printing using a sheet printer rather than a roll printer. The user logs in, at 28, and navigates to a sheet printing screen, at 150. The sheet printing screen is displayed by the UI tier 12, at 152. The UI tier 12 requests a list of sheet printers from the device engine 14, at 154. The device engine 14, in turn, queries the operating system (OS) on the computer of the user 10 for supported sheet printers, at 156. The device engine 14 filters the printer list to identify only the sheet printers, and returns the list to the UI tier 12, at 158. By way of example, the filter may apply filter logic, such as "NOT roll or shipping label printer." As with the roll printer workflow, a filter based on a whitelist of supported printers and/or print drivers may also be applied prior to returning the printer list. The UI tier 12 displays the sheet printer list, at 160, and the workflow ends at 162.

Figure 6:
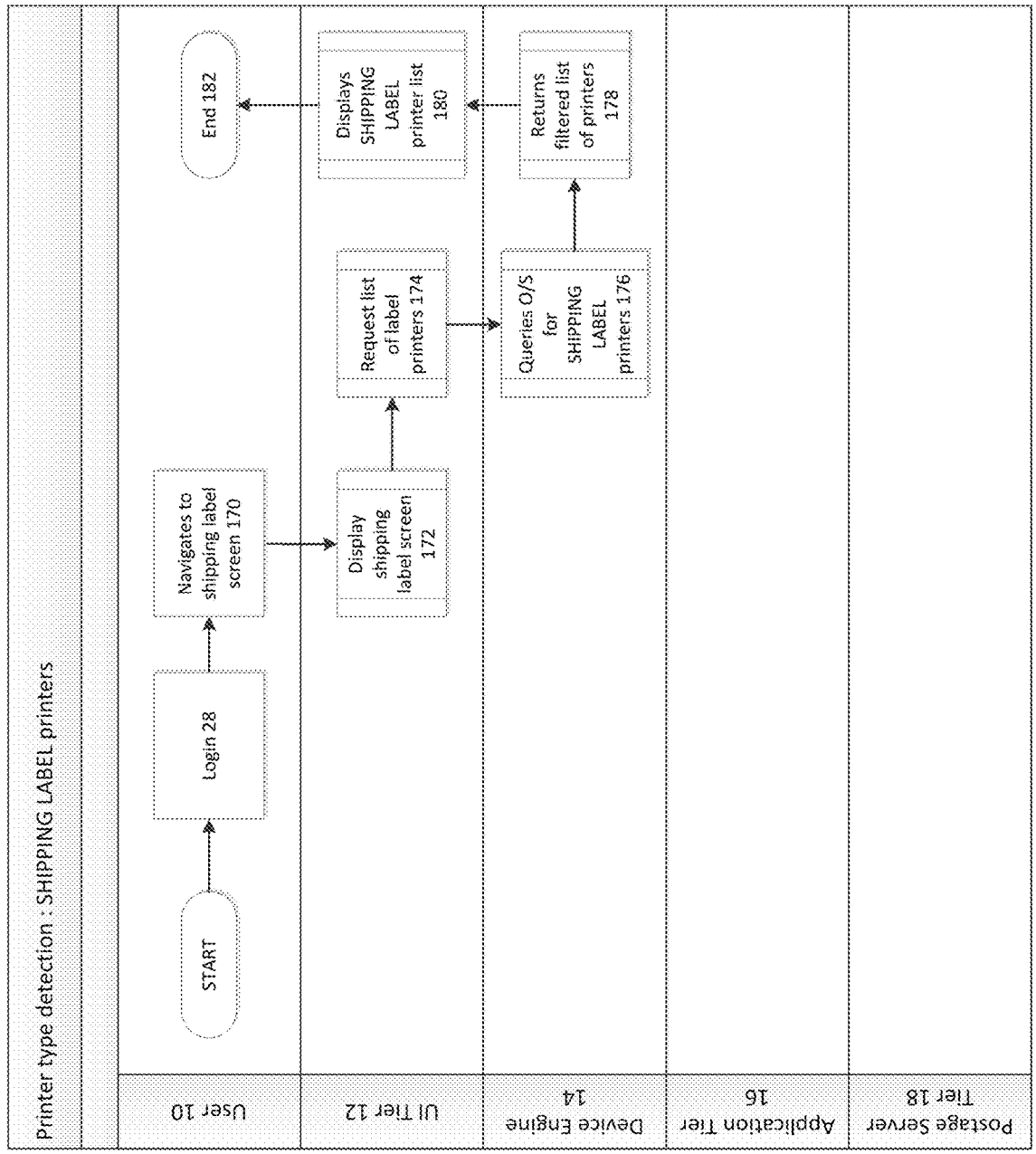
FIG. 6 is an illustration of an alternate printer identification workflow, according to yet another embodiment of the present invention.

FIG. 6 similarly illustrates a workflow for detecting a shipping label printer. The user logs in, at 28, and navigates to a shipping label screen, at 170. The UI tier 12 displays the shipping label screen, at 172, and requests a list of shipping label printers, at 174. The device engine 14 queries the operating system (OS) on the computer of the user 10 for supported shipping label printers, at 176. The device engine 14 returns a list that has been filtered to identify the shipping label printers, at 178. For example, such a filter may comprise a white list of shipping label printers and sheet printers and filter logic such as "NOT roll printers." The UI tier 12 displays a shipping label printer list, at 180, and the workflow ends, at 182.

Figure 7:
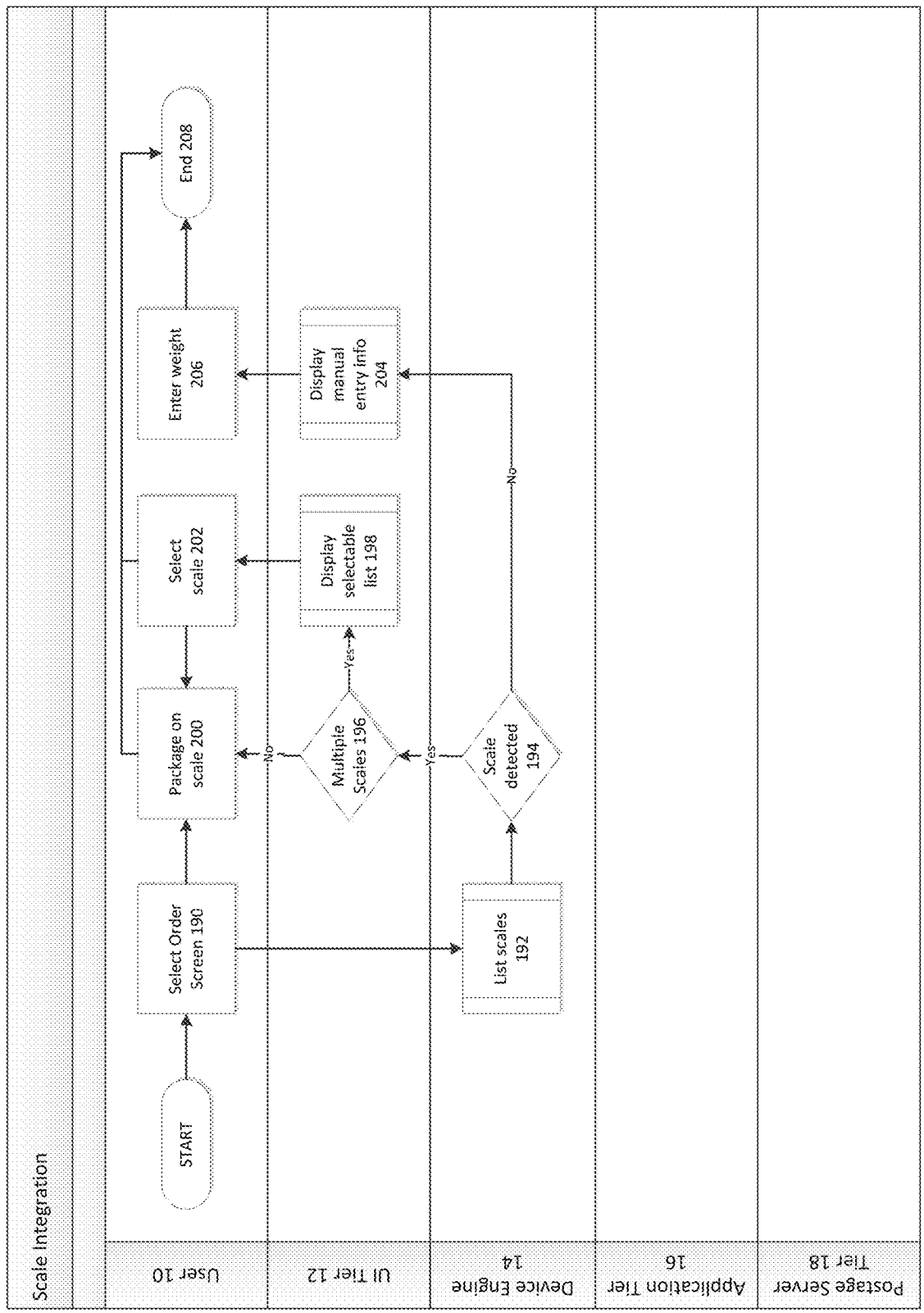
FIG. 7 is an illustration of a scale integration workflow, according to an embodiment of the present invention.

FIG. 7 illustrates a workflow for integrating a postage scale into a postage printing workflow. In practice, an integrated scale may be connected to the computer of user 10, for example by way of a corded (e.g., USB) or a cordless (e.g., WiFi) connection. The user 10 selects the shipping order screen, at 190, and the device engine 14 lists installed scale devices, at 192. To the extent that the device engine 14 does not already have such a list, it can query the operating system (OS) on the computer of the user 10 in a manner similar to that used for the printer integration described above.

The device engine 14 then determines whether scale devices are detected, and if yes, passes that information to the UI tier 12. The UI tier 12 determines whether it has been provided with information indicating that two or more scales are detected, at 196. The UI tier 12 then displays a list of detected scales, at 198. Otherwise, the user 10 proceeds to place the item to be shipped on the scale, at 200. If the list has been displayed, then the user 10 selects a particular scale to be used, at 202, and proceeds to place the item on that scale, at 200. The scale may then report the measured weight back to the application tier 16 and/or the postage server tier 18 for use in generating the postage label. In the case where no scale is detected at 194, the UI tier 12 can display a manual weight entry screen, at 204, and the user 10 may enter the weight information, at 206, after which the workflow ends, at 208.

In an embodiment, a warehouse shipping functionality is included. In a warehouse printing operation, a consumer initiates a purchase from a retailer such as a catalog or online retailer (e.g., AMAZON, etc.). The retailer creates a database record of the purchase, and generates a packing slip. The packing slip is scanned or otherwise input (for example, the packing slip may be in electronic form the entire time) into the postage printing system using a scanner. In an embodiment, the scanner is controlled by way of the device engine 14, similarly to the control of scales and/or printers as described above.

In warehouse shipping embodiments, scanned packing slips typically include order number or other identifying indicia in bar code or computer readable text form. The postage printing system queries the client database based on information from the packing slip, and sends shipping data to the postage server 18 and the device engine 14 acts as an intermediary in the communication between the attached peripheral device on the client side and the server side of the system. The servers reply with a shipping label image for printing as described above.

In some embodiments, communications between the client side and the server side may be encrypted using Secure Socket Layer (SSL) or HyperText Transfer Protocol Secure (HTTPS) protocols. In this implementation, the data in transit is well protected using SSL protocol against anyone monitoring the data traffic on the public internet or world wide web (WWW), as the SSL protocol is highly secure. Therefore, the SSL protocol protects the data while being transmitted between the server side and the client side.

Figure 8:
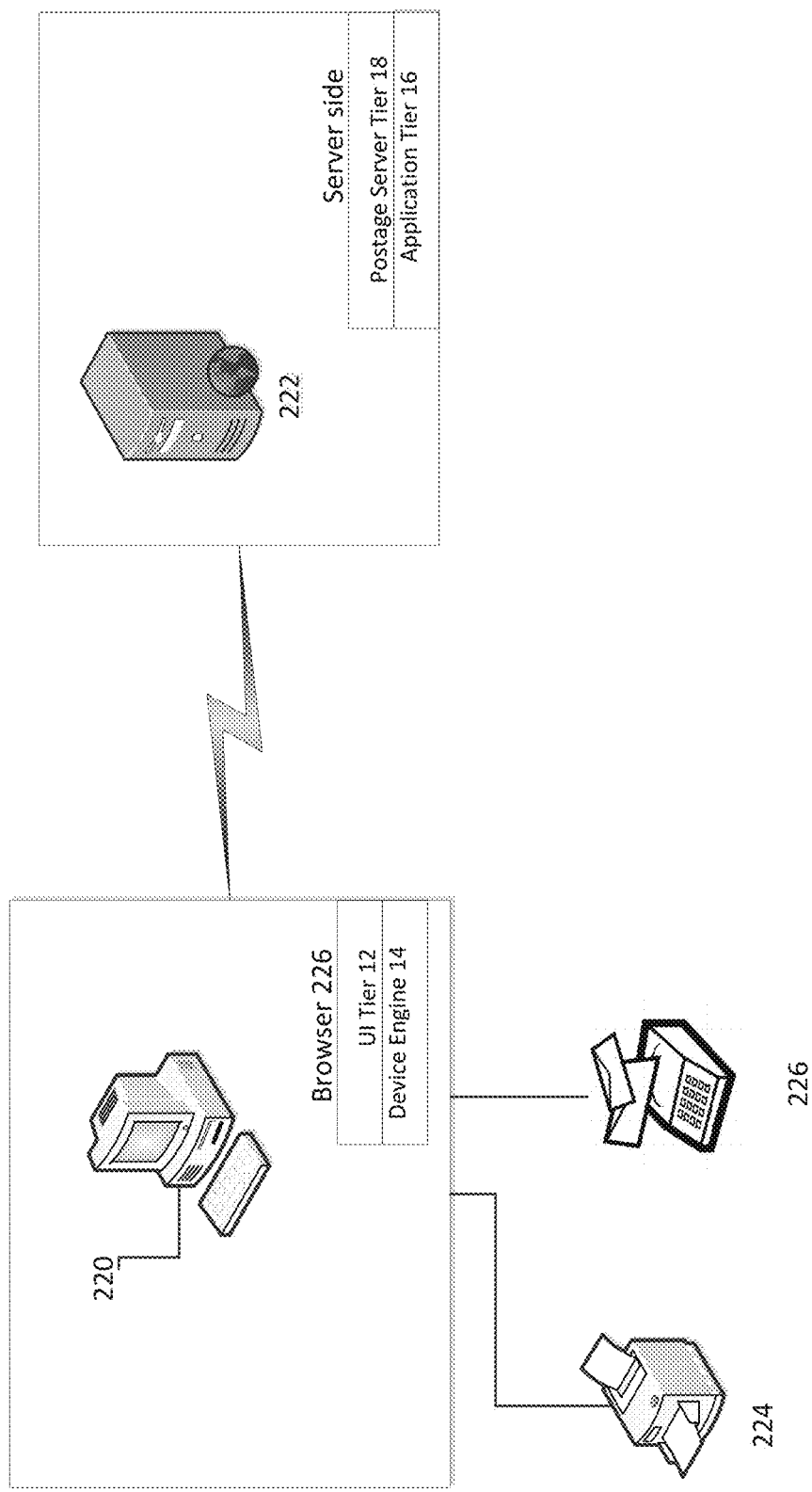
FIG. 8 is a schematic diagram of a system, according to an embodiment of the present invention.

In an embodiment, as schematically illustrated in FIG. 8, the system may be implemented in a computing system including a user computer 220 that has one or more computer processor units (CPUs) and is communicatively coupled to a web server 222 that includes one or more computer processor units (CPUs) providing the postage generation services (for example application tier 16 and postage server tier 18, respectively). The user computer 220 may include, among other things, a web-browser that can be configured to execute a Java applet (together providing the UI tier 12 and the device engine 14, for example). The user computer 220 may further be communicatively connected to one or more printers 224 and one or more scales 226 for weighing items to be posted, or scanners for implementing the warehouse shipping function (not illustrated).

In an operation, the web-browser running or executing on the user computer 220 may request the applet (device engine 14) from the web server 222, and the browser may then download the applet f (device engine 14) from the web server 222 in an operation. Subsequently, the browser may run the applet on the user computer 220 in an operation, wherein the applet may be configured to communicate with the web server 222 in an operation to request a printable postage indicium. Upon validating the request, the printable postage indicium may be received at the user computer 220 via the applet in an operation, and the applet may be configured to render the printable postage indicium to the attached printer 224. Accordingly, the entire process for requesting and printing an image may be handled within the applet (running on the user computer 220), which ensures that the postage indicium is not rendered on a display device coupled to the user computer 220.

Implementations of the invention may be made in hardware, firmware, software, computer program modules, or various combinations thereof. The invention may also be implemented as instructions stored on a machine-readable medium, which may be read and executed using one or more processing devices. In one implementation, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, computer program modules, or instructions may be described in the above disclosure in terms of specific exemplary aspects and implementations performing certain actions, it will be apparent that such descriptions are merely for the sake of convenience and that such actions in fact result from computer systems, computing devices, processing devices, computer processor units, controllers, or other devices or machines executing the firmware, software, routines, computer program modules, or instructions.

Although the various steps of the method are described in the above paragraphs as occurring in a certain order, the present application is not bound by the order in which the various steps occur. In fact, in alternative embodiments, the various steps can be executed in an order different from the order described above.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed:

1. A method for conducting a web-based postage transaction, the method being implemented by a computer system, the method comprising:

providing, by the computer system, an applet embedded on a web page to a client computer, the embedded applet being provided in response to the client computer accessing the web page;

receiving, by the computer system, from the client computer, a request related to a postage transaction; and causing, by the computer system, in response to the request, a validation check to be performed by providing a validation token to the embedded applet at the client computer to be validated by the embedded applet, wherein, based on a determination by the embedded applet at the client computer that the validation token is valid, the embedded applet at the client computer is configured to execute at least a part of the request.

2. The method of claim 1, wherein the request comprises a print request to print postage indicium, the method further comprising:

providing, by the computer system, postage indicium data representing the postage indicium to the embedded applet at the client computer such that the postage indicium data remains inaccessible by the client computer for rendering the postage indicium at a display device of the client computer; and wherein, based on the determination by the embedded applet at the client computer that the validation token is valid, the embedded applet at the client computer executes at least part of the request by rendering the postage indicium to a printer in communication with the client computer without the postage indicium being rendered at the display device of the client computer.

3. The method of claim 1, wherein receiving the request from the client computer comprises receiving, by the computer system, a print request from the embedded applet at the client computer.

4. The method of claim 1, wherein the embedded applet at the client computer is configured such that, had the embedded applet determined that the validation token was not valid, the embedded applet would not have executed the request.

5. The method of claim 1, wherein the validation token comprises a session identifying token that expires in response to a specified condition.

6. The method of claim 5, wherein the specified condition is the expiration of a selected amount of time.

7. The method of claim 5, wherein the specified condition is a disconnection between the computer system and the client computer.

8. The method of claim 1, wherein the determination by the embedded applet at the client computer that the validation token is valid comprises the embedded applet (i) decrypting the validation token to produce a decrypted version and (ii) comparing the decrypted version against session information to determine that the validation token is valid.

9. The method of claim 1, wherein the embedded applet is compiled from the embedded applet's source code that includes a plurality of reference host addresses, wherein the validation check by the embedded applet at the client computer comprises using at least one of the plurality of reference host addresses to validate a host web server, of the computer system, to which the client computer is connected, and wherein the embedded applet at the client computer executes at least part of the request further based on a determination by the embedded applet at the client computer that the host web server is a valid host web server.

10. A system for conducting a web-based postage transaction, the system comprising a computer system configured by computer program instructions that cause the computer system to:

provide an applet embedded on a web page to a client computer, the embedded applet being provided in response to the client computer accessing the web page;

receive, from the client computer, a request related to a postage transaction; and cause, in response to the request, a validation check to be performed by providing a validation token to the embedded applet at the client computer to be validated by the embedded applet, wherein, based on a determination by the embedded applet at the client computer that the validation token is valid, the embedded applet at the client computer is configured to execute at least a part of the request.

11. The system of claim 10, wherein the request comprises a print request to print postage indicium, and wherein the computer system is caused to:

provide postage indicium data representing the postage indicium to the embedded applet at the client computer such that the postage indicium data remains inaccessible by the client computer for rendering the postage indicium at a display device of the client computer; and wherein, based on the determination by the embedded applet at the client computer that the validation token is valid, the embedded applet at the client computer executes at least part of the request by rendering the postage indicium to a printer in communication with the client computer without the postage indicium being rendered at the display device of the client computer.

12. The system of claim 10, wherein receiving the request from the client computer comprises receiving a print request from the embedded applet at the client computer.

13. The system of claim 10, wherein the embedded applet at the client computer is configured such that, had the embedded applet determined that the validation token was not valid, the embedded applet would not have executed the request.

14. The system of claim 10, wherein the validation token comprises a session identifying token that expires in response to a specified condition.

15. The system of claim 14, wherein the specified condition is the expiration of a selected amount of time.

16. The system of claim 14, wherein the specified condition is a disconnection between the computer system and the client computer.

17. The system of claim 14, wherein the determination by the embedded applet at the client computer that the validation token is valid comprises the embedded applet (i) decrypting the validation token to produce a decrypted version and (ii) comparing the decrypted version against session information to determine that the validation token is valid.

18. The system of claim 14, wherein the embedded applet is compiled from the embedded applet's source code that includes a plurality of reference host addresses, wherein the validation check by the embedded applet at the client computer comprises using at least one of the plurality of reference host addresses to validate a host web server, of the computer system, to which the client computer is connected, and wherein the embedded applet at the client computer executes at least part of the request further based on a determination by the embedded applet at the client computer that the host web server is a valid host web server.

19. One or more non-transitory computer-readable storage media comprising computer instructions that, when executed by one or more processors of a computer system, cause the computer system to perform operations comprising:

providing an applet embedded on a web page to a client computer, the embedded applet being provided in response to the client computer accessing the web page;

receiving, from the client computer, a request related to a postage transaction; and causing, in response to the request, a validation check to be performed by providing a validation token to the embedded applet at the client computer to be validated by the embedded applet, wherein, based on the embedded applet at the client computer (i) decrypting the validation token to produce a decrypted version and (ii) determining from the decrypted version that the validation token is valid, the embedded applet at the client computer is configured to execute at least part of the request.

20. The one or more non-transitory computer-readable storage media of claim 19, wherein the embedded applet at the client computer is configured to compare the decrypted version against session information to determine whether the validation token is valid.

* * * * *